United States Patent
Bocamazo et al.

(10) Patent No.: US 12,425,721 B1
(45) Date of Patent: *Sep. 23, 2025

(54) OPTICAL LENS CHARACTERIZATION AND CALIBRATION

(71) Applicant: Amazon Technologies, Inc., Seattle, WA (US)

(72) Inventors: Michael Robert Bocamazo, Framingham, MA (US); Frank Preiswerk, Brooklyn, NY (US)

(73) Assignee: Amazon Technologies, Inc., Seattle, WA (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/540,492

(22) Filed: Dec. 14, 2023

(51) Int. Cl.
| | |
|---|---|
| *H04N 23/60* | (2023.01) |
| *G06K 7/14* | (2006.01) |
| *G06T 7/50* | (2017.01) |
| *G06V 10/74* | (2022.01) |
| *H04N 23/55* | (2023.01) |
| *H04N 23/67* | (2023.01) |

(52) U.S. Cl.
CPC ......... *H04N 23/64* (2023.01); *G06K 7/1447* (2013.01); *G06T 7/50* (2017.01); *G06V 10/761* (2022.01); *H04N 23/55* (2023.01); *H04N 23/67* (2023.01)

(58) Field of Classification Search
CPC ........ H04N 23/64; H04N 23/67; H04N 23/55; G06T 7/50; G06V 10/761; G06K 7/1447
USPC ...................................... 348/222.1
See application file for complete search history.

(56) References Cited

U.S. PATENT DOCUMENTS

| | | |
|---|---|---|
| 5,969,325 A | 10/1999 | Hecht et al. |
| 12,273,621 B1 | 4/2025 | Can et al. |
| 2006/0202040 A1 | 9/2006 | Wang et al. |
| 2007/0285537 A1 | 12/2007 | Dwinell et al. |
| 2011/0155808 A1 | 6/2011 | Santos et al. |
| 2012/0173347 A1 | 7/2012 | Nieves et al. |

(Continued)

OTHER PUBLICATIONS

W. Liu and K. Xie, "A camera calibration method based on neural network optimized by genetic algorithm," 2007 IEEE International Conference on Systems, Man and Cybernetics, Montreal, QC, Canada, 2007 (Year: 2007).*

(Continued)

*Primary Examiner* — Ayman A Abaza
(74) *Attorney, Agent, or Firm* — Kilpatrick Townsend & Stockton LLP

(57) ABSTRACT

Techniques for optical lens characterization and calibration are described herein. In an example, a computer system receives a first image of a target captured by an image acquisition system having a camera and a lens and using first setting values in a setting space. The computer system inputs the first setting values and a first decode performance associated with image acquisition system having the first setting values for the barcode sets in the first image into a machine learning model and determines a representation of the setting space. The computer system inputs the machine learning model and one or more conditions into an algorithm and receives an output indicating second setting values in the setting space for the image acquisition system. The computer system sends the second setting values to the controller, which is configured to set the settings for the image acquisition system based on the second setting values.

20 Claims, 8 Drawing Sheets

(56) References Cited

U.S. PATENT DOCUMENTS

2013/0256417 A1   10/2013  Lee
2016/0267308 A1    9/2016  Nishi et al.
2024/0220753 A1*  7/2024  Ku ..................... G06K 7/1443

OTHER PUBLICATIONS

Cognex, New Features In VisionPro 10.0, DataMatrix Fiducial Marks, 2021 (Year: 2021).*
U.S. Appl. No. 18/127,426, titled "Optical Resolution Determination From Barcode Chart Images", filed Mar. 28, 2023, 44 pages.

* cited by examiner

OPTICAL LENS CHARACTERIZATION AND CALIBRATION

BACKGROUND

Optical resolution is the ability of a camera to optically capture finely spaced details in acquired images. The overall resolution of a vision system depends on a number of factors including lens resolution, lens aperture, pixels size, signal-to-noise ratio (SNR) of the sensor, image contrast, and image signal processing on the camera. Modulation Transfer Function (MTF) is a common method for measuring the optical performance of a vision system. Generally, as the spatial frequency increases, the contrast keeps decreasing until adjacent lines become visually undistinguishable.

BRIEF DESCRIPTION OF THE DRAWINGS

Various embodiments in accordance with the present disclosure will be described with reference to the drawings, in which.

DETAILED DESCRIPTION

Figure 1:
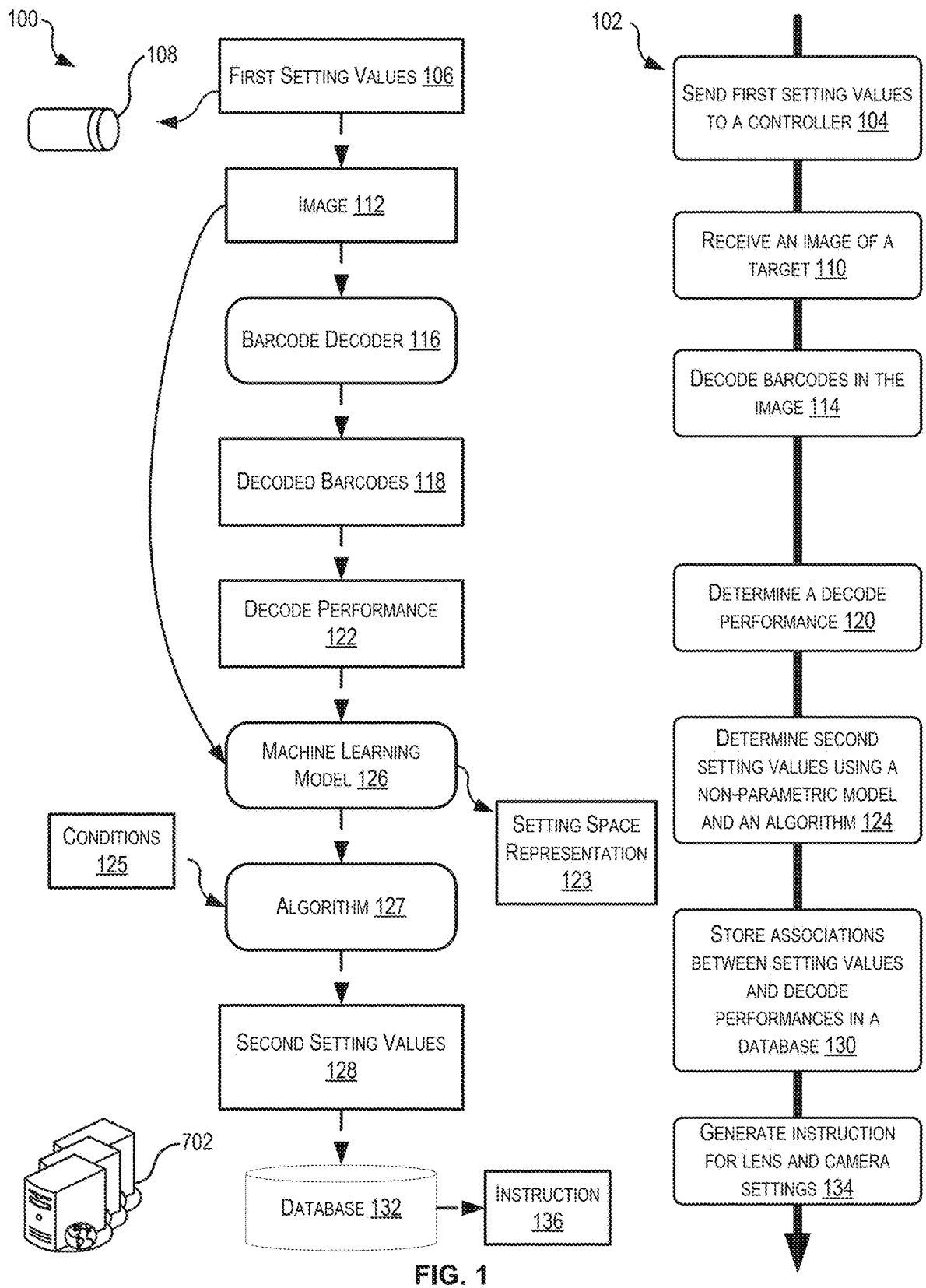
FIG. 1 illustrates an example block diagram and associated flowchart showing a process for implementing techniques relating to optical lens characterization and calibration, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, various techniques for optical lens characterization and calibration. A computing device can perform operations relating to determining performance of an image acquisition system having various sets of settings. A database of the settings and performances may be generated and then used to determine settings to be used for operation of the camera with a particular lens.

In an example, a target that includes steps that are located at different depths with respect to a lens of a camera is imaged by the camera for each set of setting values. Between image captures, the settings related to a distance between the camera and the target, a focus distance, and an aperture value of the camera may be changed. Each step of the target can include sets of barcodes, and each set of barcode may include barcodes of different sizes (e.g., different lengths, widths, line thicknesses, etc.). Each barcode in the set can have a different barcode attribute, which may refer to the smallest barcode line width of the barcode. The computing device can decode the barcodes depicted in each image to determine a decode performance associated with each set of setting values. The decode performance and corresponding set of setting values for each image are stored in a database. In addition, the decode performance and the set of setting values can be input into a machine learning model, which determines a representation of a setting space. To further model a performance of the lens across the setting space, the machine learning model and conditions (e.g., a sample density, error minimization, optimality condition, and/or other approach) can be input into an algorithm, which outputs a vector indicating another set of setting values to explore. The computing device can then send the other set of setting values to a controller associated with the camera, which automatically adjusts the settings according to the other set of setting values. Once the setting space is sufficiently explored (e.g., based on the conditions), the database storing the associations between the decode performances and the set of values can be queried by the computing device to determine setting values associated with a best decode performance for a given camera. In addition, a depth of field an image acquisition system can be determined based on the decode performances. These approaches may be useful for selecting cameras for use in certain environments when constraints are known.

Conventionally, determining a depth of field may require a manual adjustment of camera settings. Collecting data for many different focus and aperture settings is typically time-consuming and liable to inaccuracies. In addition, conventional systems may be limited to setting the aperture to predetermined values and manually focusing the camera by checking decode performance on a barcode target. Embodiments of the present disclosure make finding the depth of field faster and easier for the operator. Both the focus and aperture mechanisms can be actuated and a performance can be checked automatically. In addition, the embodiments allow an aperture setting that is not marked to be used. The process further makes the result more accurate compared to the conventional process since the actuation is controlled directly by the computer system with no human intermediary to interpret the result of the focusing quality that is conventionally displayed via a user interface and then translated into a physical movement of the lens knobs. Further, the computer system with robotic control can apply smoothing through time to compensate for noisy observations because it learns what control settings corresponded to which decode performance, but the human operator cannot as accurately remember the positions of the knobs that correspond to specific decode performance values. The decode performance of the embodiments of the present disclosure may also be a relevant performance metric for applications such as computer vision systems designed for decoding barcodes. The same metric could be used to measure the overall performance as a function of signal-to-noise ratio, image contrast, and different image signal processing parameters.

In a particular example, a computing device, such as a webserver, a personal computing device, a tablet computer, a smartphone, or the like, can determine first setting values for an image acquisition system that includes a camera having a lens. The first setting values can be a distance to a target of one meter, a focus distance of one meter, and an aperture value of f/2.8. Of course, other values for each of these setting may be used. The computing device receives an image of a target captured by the camera having the first setting values. The target has sets of barcodes with different barcode attributes. Barcodes in each set may have a different X dimension, representing the smallest barcode line width of the barcode. For instance, the X dimensions of the barcodes may be 4.2 mil, 5 mil, 5.9 mil, 7.1 mil, 8.3 mil, and 10 mil. The image can be processed by a barcode decoder to decode the barcodes in the image, where 1 mil is 1/1000th of an inch. The computing device can determine a decode performance for the image acquisition system having the first set of setting values. The decode performance may be represented at a decimal from 0.0 to 1.0 (e.g., 0.7). The computing device inputs the first set of setting values and the decode performance into a Gaussian process regression model, which determines a representation of the setting space. The computing device can then input the Gaussian process regression model and a sample density condition into an algorithm, which outputs an indication of a second set of setting values that are different than the first set. For example, the second set of setting values may include a distance to a target of two meters, a focus distance of ten centimeters, and an aperture value of f/1.8. A controller adjusts the settings of the image acquisition system according to the second set of setting values and another image is captured. The computing device determines a decode second performance associated with the camera having the second set of setting values (e.g., 0.5). This process may again be repeated until additional sets of setting values and corresponding decode performances have been determined for a range of setting values (e.g., a setting space). In addition, the sets of setting values and the decode performances may be stored in a database. The computing device (or a different computing device) can then query the database to determine that the first set of setting values are to be used for the camera with the lens because the decode performance is higher than that for the second set of setting values. In addition, a camera may be picked based on a query of the database given a set of constraints. For instance, if a target distance, focus distance, and aperture value are predefined, the computing device (or a different computing device) can query the database to determine a camera that is associated with a highest decode performance having the predefined target distance, focus distance, and aperture value. This technique may be used to select the camera from a predefined set of cameras such as a set of standard cameras available for use in barcode scanning environments.

Turning now to the figures, FIG. 1 illustrates an example block diagram 100 and associated flowchart showing a process 102 for implementing techniques relating to optical lens characterization and calibration, according to at least one example. The diagram 100 depicts devices, objects, and the like that correspond to the process 102. The process 102 can be performed by any suitable combination of hardware and/or software, as described herein.

FIGS. 1, 4, 5, and 6 illustrate example flow diagrams showing respective processes 102, 400, 500, and 600, as described herein. The processes 102, 400, 500, and 600, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A setting analysis engine 710 (FIG. 7) embodied in a computer system 702 (FIG. 7) and/or within a user device 704 (FIG. 7) may perform the process 102. Thus, while the description below is from the perspective of the computer system 702, the user device 704 may also perform the process 102 or portions of the process 102.

The process 102 may begin at block 104 by the computer system 702 sending first setting values 106 to a controller. The first setting values 106 correspond to settings for a camera 108 (or a lens of the camera) and are within a setting space. The camera and the lens are part of an image acquisition system. In an example, the first setting values 106 may include a value for a distance from the focal point to a target that is to be captured in an image, a value for a focus distance for the camera 108, and a value for an aperture value for the camera 108. Other exemplary settings include zoom, lighting conditions, flash, gain, motion speed of a target, etc. The focus distance corresponds to a distance to a plane of optimal focus (sharpness) and the aperture value corresponds to the opening in the lens through which light passes to enter the camera 108. The focus distance setting may correspond to a positioning of a focus distance adjustment mechanism (e.g., a knob) on the camera 108, or the actual distance to the plane of optimal focus. Over time, the focus distance can be empirically measured based on observed decode performance at different distances. The output of a sampling algorithm can be a control point in terms of the physical position of the knob which does determine the focus distance, but at the beginning, the mapping between physical knob positions and focus distances is not known. The setting space refers to a range of values for each of the settings.

The first setting values 106 may be default setting values, may be randomly selected, or may be determined using an algorithm. The controller, which is coupled to the camera, receives the first setting values 106 and sets the settings of the camera 108 according to the first setting values 106. That is, the controller can adjust the target distance, the focus distance, and the aperture value based on the first setting values 106. Once the settings are set, the camera 108 can capture an image 112 of the target.

The process 102 may continue at block 110 by the computer system 702 receiving the image 112 of the target captured by the camera 108. In this case, the target is a fixture that includes barcodes arranged in sets. The target may be a circular object with a center that can align with an optical axis of the camera 108. A radius of the target may be in an XY-plane and a depth of the target can be along a Z-axis. In another example, the target may be a square object with a center that can align with the optical axis of the camera 108. A perimeter of the target may be in the XY-plane and the depth of the target can be along the Z-axis. Other targets may be other shapes or constructions such as triangles, pentagons, hexagons, etc. The target can include multiple steps that are each an equal portion of the perimeter (or radius) and are each located at a different depth along the Z-axis. For instance, if the target is circular, the target may include three steps that are each one-third of the radius. A first step may be at a first depth that aligns with the focal plane of the lens of the camera 108, a second step can be located at a second depth that is a distance from the first depth in a positive Z-direction, and a third step can be located at a third depth that is the same distance from the first depth, but in a negative Z-direction. If the target is square, the target may include four quadrants each at different depths.

In an example, the steps of the target can include barcode sets. The barcodes may be one-dimensional barcodes or two-dimensional barcodes. Examples of barcodes that may be in the barcode sets include universal product code (UPC) barcodes, interleaved two of five (ITF) barcodes, international article number (EAN) barcodes, quick response (QR) barcodes, etc. Each barcode has an attribute that may be different from the barcode attributes of other barcodes in the set. For instance, the barcode attribute may be an X dimension representing a width of a thinnest line in the barcode. The sets of barcodes of the target may be arranged in various orientations around the center of the target. For example, the barcode sets may be radially oriented towards the center of the target, tangentially oriented with respect to the Z-axis at the center of the target, horizontally oriented, vertically oriented, or a combination thereof. Since the center of the target can align with an optical axis of the camera 108, the barcode sets can be arranged at different distances away from the center line, or optical axis, of the camera 108.

The process 102 may continue at block 114 by the computer system 702 decoding barcodes in the image 112. The image 112 can be processed by a barcode decoder 116 to decode the barcode sets. The barcode decoder 116 can be an off-the-shelf barcode reader that scans the barcodes depicted in the image 112. The computer system 702 may define a barcode manifest of the barcodes before the image 112 is captured, and the barcode manifest can be used to determine decoded barcodes 118. The barcode manifest can include encoded information associated with the barcodes of the target. In an example, the encoded information for a barcode can include a step identifier indicating the step that the barcode is positioned on, a size identifier indicating the barcode attribute (e.g., X dimension) of the barcode, and any other suitable information about the barcode (e.g., orientation, relative size, number in a set of barcodes, etc.). A barcode may be considered a decoded barcode if the information decoded by the barcode decoder 116 matches the encoded information for that barcode in the barcode manifest. Barcodes that are not decoded or are decoded as an incorrect value are not considered to be part of the decoded barcodes 118.

The process 102 may continue at block 120 by the computer system 702 determining a decode performance 122 of the barcode sets. The decode performance 122 may correspond to a decode rate related to the barcode attributes. An example of determining a decode rate is described in U.S. patent application Ser. No. 18/127,426, which is herein incorporated by reference in its entirety. Based on the decoded barcodes 118, the computer system 702 can determine a number of decoded barcodes in each orientation and having a particular barcode attribute. That is, if the barcode attribute is the X dimension of the barcode and the orientations are horizontal and vertical, the computer system 702 can determine the number of decoded barcodes at each X dimension and in each of the horizontal orientation and vertical orientation that are included in the decoded barcodes 118. Due to the arrangement of the barcode sets on the target, the decode performance 122 can correspond to a performance of the lens across a field of view of the camera 108.

The process 102 may continue at block 124 by the computer system 702 determining second setting values 128 using a machine learning model 126 and an algorithm 127. The machine learning model 126 may be a non-parametric model, such as a decision tree, a support vector machine, a Gaussian process regression model, and the like. The computer system 702 can input the first setting values 106 and the decode performance 122 associated with the first setting values 106 into the machine learning model 126, which can generate a setting space representation 123. The setting space representation 123 represents the observed setting space. In addition, the machine learning model 126 may implicitly learn a manifold of the setting space. In addition to the first setting values 106 and the decode performance 122, the computer system 702 can also input a three-dimensional (e.g., six degrees of freedom) relative position of the barcodes in relation to the camera 108 into the machine learning model 126. The computer system 702 can input the machine learning model 126 and conditions 125 into the algorithm 127 and receive the second setting values 128 as an output. The output can be a vector that includes the second setting values 128. For instance, a first value in the vector can indicate an updated distance to the target for the camera 108, a second value in the vector can indicate an updated focus distance for the camera 108, and a third value in the vector can indicate an updated aperture value for the camera 108. The vector may include any suitable camera settings that are being explored. At least one of the values of the second setting values 128 can be different from the values of the first setting values 106.

The algorithm 127 can determine the second setting values 128 based on the conditions 125. For instance, the conditions 125 can include one or more of a sample density in the setting space, an error minimization, and an optimality. The sample density can correspond to a distribution of setting values analyzes across the setting space. The error minimization can correspond to collecting samples (e.g., evaluations of decode performance for different setting values) of an area of the setting space in which there is a large deviation (e.g., bigger than a threshold) between a predicted decode performance determined by a model (e.g., the machine learning model 126 or a different model) and the actual observed decode performance. The optimality can correspond to setting values that are associated with a highest decode performance for a given parameter. For instance, for a given distance between the camera 108 and the target, the setting values for a best depth of field, reflected by the decode performance, may be determined. So, the algorithm 127 can select the second setting values 128 based on the machine learning model 126 and the conditions 125. Initially, the algorithm 127 may select setting values based on the sample density. Once the computer system 702, or the algorithm 127, determines that the sample density exceeds a threshold, meaning that a sufficient number of samples have been gathered across the setting space, the algorithm 127 may change to selecting setting values based on error minimization and/or optimality.

The computer system 702 can send the second setting values 128 to the controller associated with the camera 108, which can adjust the settings of the camera 108 according to the second setting values 128. Another image can be generated using the second setting values 128, which the computer system 702 can decode. A decode performance for the barcode sets in the new image can be determined and the machine learning model 126 can determine an updated representation of the setting space. In addition, the algorithm 127 can again determine additional setting values for the camera 108. This iterative process can be repeated until the conditions 125 of the algorithm 127 are satisfied, meaning that the setting space has been sufficiently explored according to its criteria.

The process 102 may continue at block 130 by the computer system 702 storing associations between setting values and decode performances in a database 132. So, the computer system 702 can store the decode performance 122 in association with the first setting values 106 in the database 132. In addition, the database 132 can include associations of other sets of setting values for the camera 108 having the lens and their corresponding decode performances. Additional associations can also be stored for sets of settings for the camera 108 having a different lens and their corresponding decode performances. The database 132 can then be used to select optimal settings for the camera 108 given a particular lens. The database 132 may also be used to select settings and a lens for a different camera that is of a same type (e.g., model) as the camera 108.

The process 102 may continue at block 134 by the computer system 702 generating an instruction 136 for lens and camera settings. In an example, the computer system 702 may query the database 132 to determine which set of setting values for a particular lens are associated with a highest decode performance. The instruction 136 can then be generated to indicate that the camera 108 is to be operated with the particular lens using the set of settings with the highest decode performance. In another example related to calibration of a lens, a working distance of the camera 108 to the target may be set. The working distance can correspond to a distance to the target, which is reflected in the setting values. So, the computer system 702 can query the database 132 and determine a set of associations in the database 132 that have the working distance as a setting value. The computer system 702 can then determine which association of the set of associations has the highest decode performance and output the instruction 136 for operating the camera 108 with the lens using the setting values associated with the highest decode performance.

The computer system 702 may determine a lens to use with the camera 108 based on the database 132. For instance, the computer system 702 can query the database 132, which stores associations between setting values and decode performances for multiple lenses used with the camera 108, to determine which setting values are associate with a highest decode performance across all lenses. The computer system 702 can then output the instruction 136 for operating the camera 108 with the lens and having the setting values associated with the highest decode performance.

Figure 2:
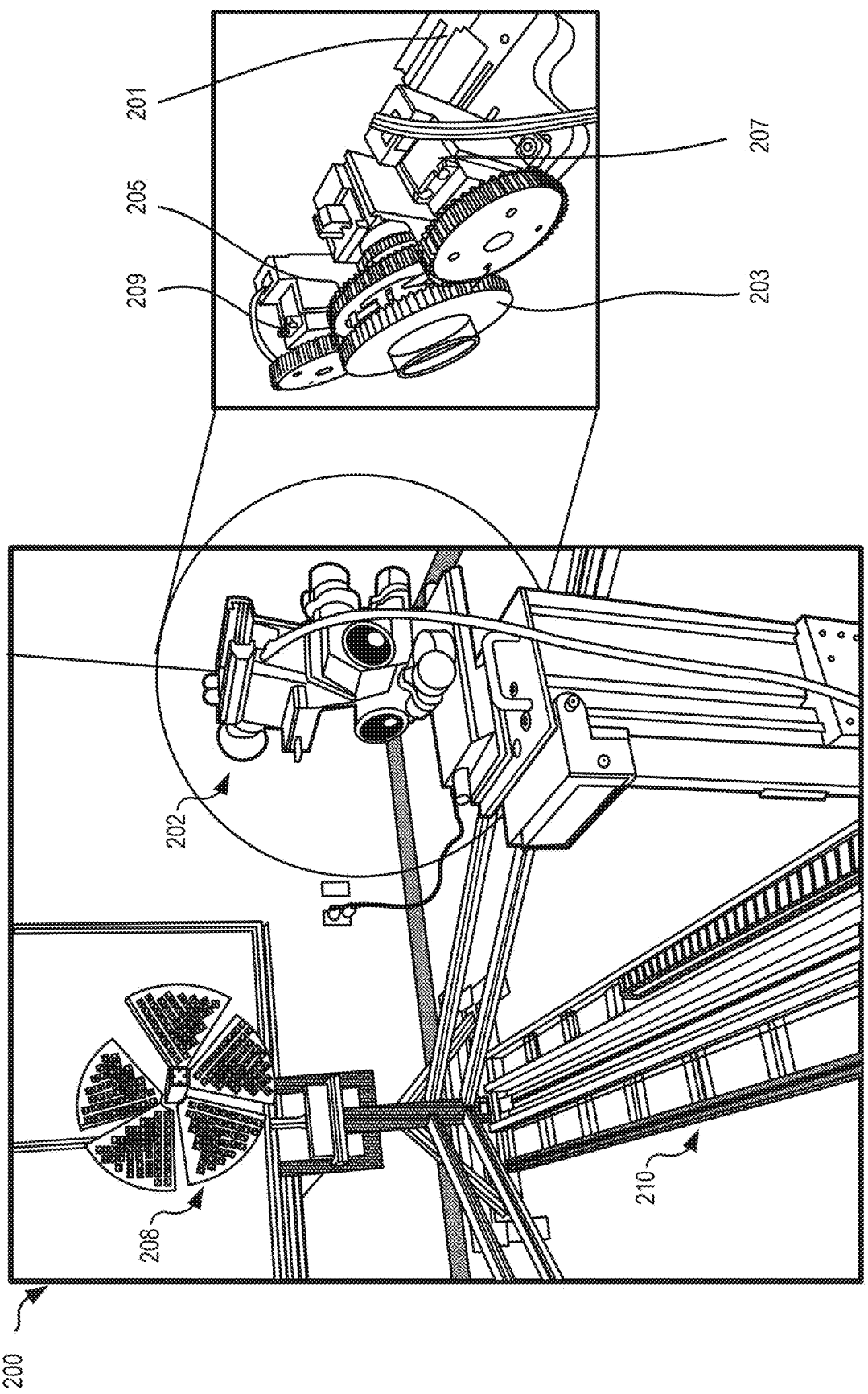
FIG. 2 illustrates an example system for optical lens characterization and calibration, according to at least one example.

FIG. 2 illustrates an example system 200 for optical lens characterization and calibration, according to at least one example. The system 200 includes a camera 202 with a lens and a target 208. A center of the target 208 can be aligned with an optical axis of the camera 202. A radius of the target 208 is in an XY-plane and a depth of the target 208, and the optical axis, is along the Z-axis. The camera 202 is coupled to (e.g., mounted on) a rail 210. The camera 202 is affixed atop a column that can be motorized to slide along the rail 210. The column can move along the rail 210 to adjust a distance of the camera 202 from the target 208. A controller 201 can receive camera settings indicating a particular distance at which the camera 202 is to be set, and a motor coupled to the column can move the camera 202 to the particular distance. Examples of the motor may include a stepper motor, a linear motor, a direct current motor, or any other suitable motor.

In addition, the system 200 can include a first gear 203 coupled to a focus distance adjuster of the camera 202 and a second gear 205 coupled to an aperture value adjuster of the camera 202. A first motor 207 can be coupled to the first gear 203 and the controller 201, and the controller 201 can instruct the first motor 207 to set a focus distance of the camera 202 based on the received camera settings by adjusting the first gear 203. A second motor 209 can be coupled to the second gear 205 and the controller 201, and the controller 201 can similarly instruct the second motor 209 to set an aperture value of the camera 202 based on the received camera settings by adjusting the second gear 205. Examples of the first motor 207 and the second motor 209 include servo motors, stepper motors, a brushless direct current motor, a combination thereof, or any other suitable motor.

A lens may typically come with set screws that allow the lens to be locked in place if tightened sufficiently. Instead of fully tightening the set screws, an outline of the set screw is included as an inset in the first gear 203 so that the set screw fits within the first gear 203 and a tangential force on the first gear 203 by the first motor 207 creates a lateral force on the set screw which turns the focus distance adjuster.

Figure 3:
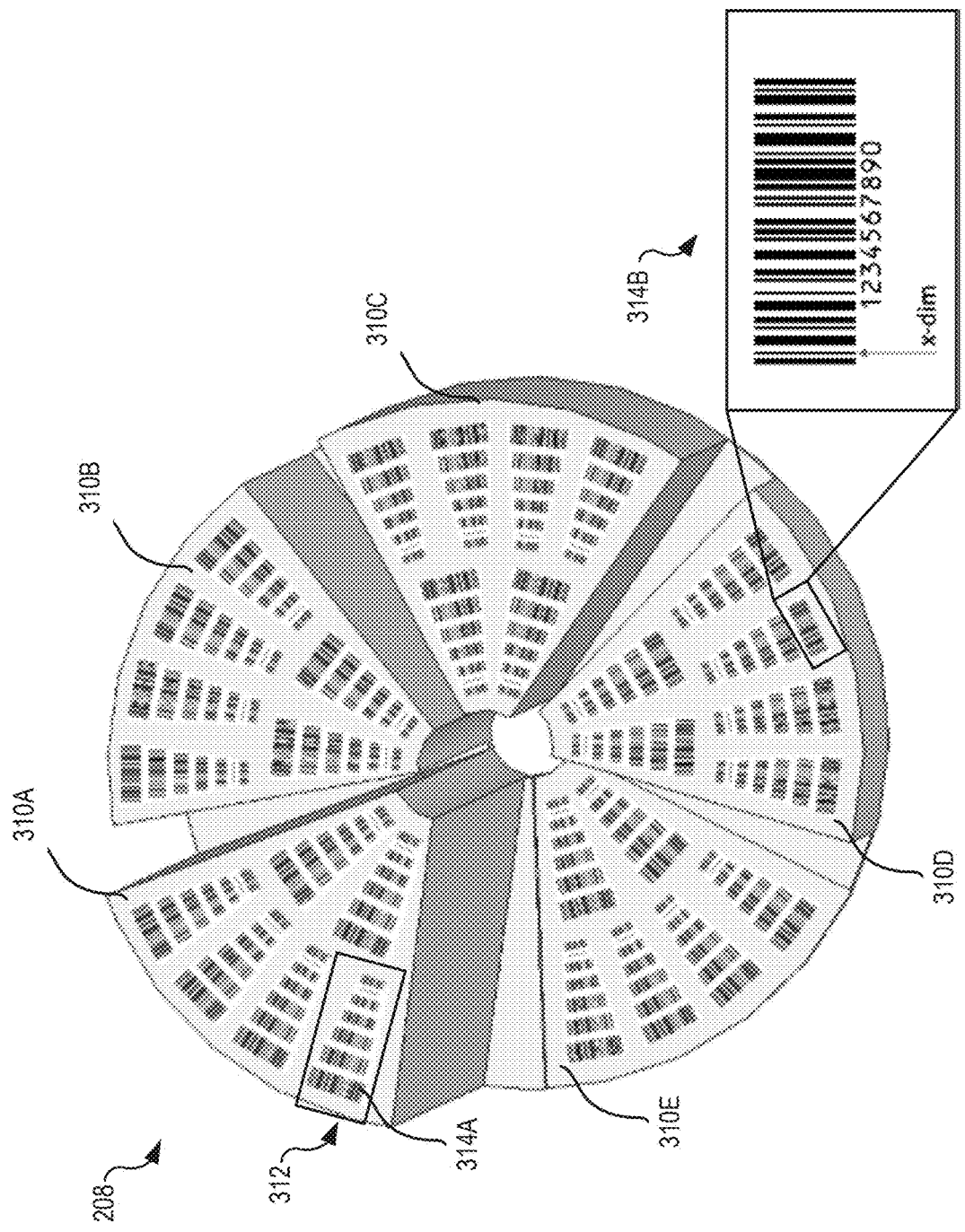
FIG. 3 illustrates an example target for optical lens characterization and calibration, according to at least one example.

FIG. 3 illustrates an example target 208 for optical lens characterization and calibration, according to at least one example. The target 208 may be the target shown in FIG. 2, with steps 310A-E. The target 208 includes multiple steps 310A-E that are each an equal portion of the radius and are each located at a different depth along the Z-axis. As illustrated, the target 208 includes five steps 310A-E that are orthogonal to the optical axis of the camera and are each one-fifth of the radius. Each step 310A-E is illustrated as including six barcode sets 312 oriented towards a center of the target 208, meaning that the barcodes 314A-B are oriented radially towards the center. The distribution of distances between the barcodes 314 and an optical axis may be the same for each step 310A-E on the target 208.

Each barcode set 312 is illustrated as including six barcodes 314, and each barcode 314 has a different barcode attribute. In FIG. 3, the barcode attribute is shown as being the X dimension, which is the width of the smallest element of the barcode 314B. For example, for a one-dimensional barcode, the X dimension is the width of the thinnest line in the barcode 314. For a two-dimensional barcode, the X dimension is the width and height of the smallest 'pixel'. Either way, for both one-dimensional and two-dimensional barcodes, the X dimension defines the necessary minimal image resolution needed to successfully read the barcode. So, decoding the barcodes 314 of the target 208 captured in images with the camera having various settings can lead to a determination of optimal settings for the camera to have a maximum decode performance.

Figure 4:
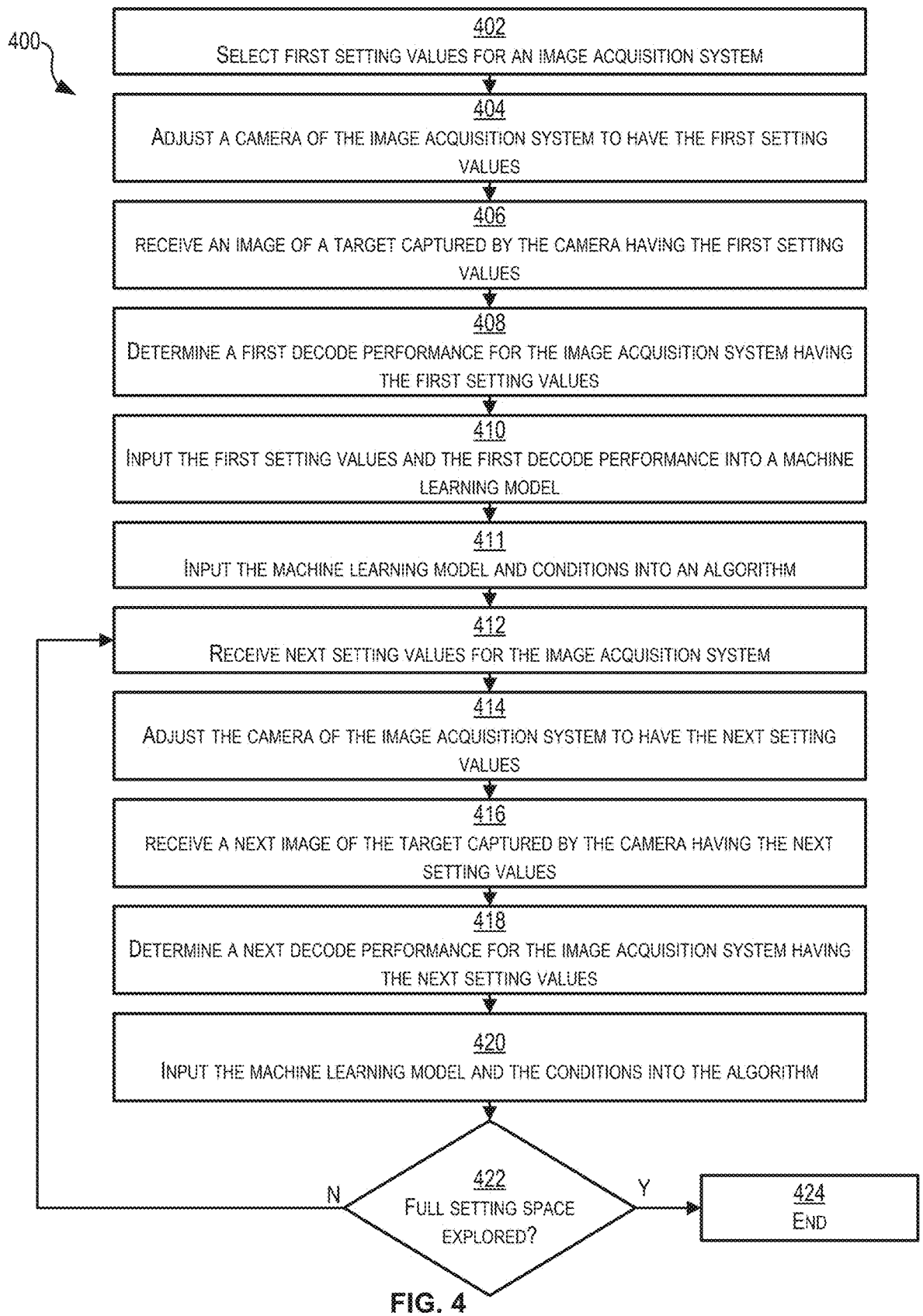
FIG. 4 illustrates an illustrates an example flowchart showing a process for implementing techniques relating to iteratively adjusting a camera for optical lens characterization and calibration, according to at least one example.

FIG. 4 illustrates an illustrates an example flowchart showing a process 400 for implementing techniques relating to iteratively adjusting a camera for optical lens characterization and calibration, according to at least one example. The setting analysis engine 710 (FIG. 7) embodied in the computer system 702 (FIG. 7) and/or within the user device 704 (FIG. 7) may perform the process 400. Thus, while the description below is from the perspective of the computer system 702, the user device 704 may also perform the process 400 or portions of the process 400.

The process 400 may begin at block 402 by the computer system 702 selecting first setting values for an image acquisition system. The image acquisition system can include a camera having a lens. The first setting values may include one or more of a distance from the camera to a target, a focus distance, an aperture value for the camera, a zoom for the camera, etc. The first setting values may be default setting values, may be randomly selected, or may be determined using an algorithm. For instance, the first setting values may be minimum values or maximum values for each camera setting in a setting space.

The process 400 may continue at block 404 by the computer system 702 adjusting the camera of the image acquisition system to have the first setting values. The camera can be coupled to one or more motors that can be controlled to adjust the camera to have the first setting values. For instance, the motor may move a first gear to set the focus distance, and the same motor or a different motor may move a second gear to set the aperture value.

The process 400 may continue at block 406 by the computer system 702 receiving an image of a target captured by the camera having the first setting values. The target includes multiple sets of barcodes, where individual barcodes in a set have a different barcode attribute. For instance, barcodes in a set may have different X dimensions. In addition, the barcode sets may be arranged at different depths relative to the camera and at different orientations relative to an optical axis of the camera.

The process 400 may continue at block 408 by the computer system 702 determining a first decode performance for the image acquisition system having the first setting values. A barcode decoder can decode the barcodes in the barcode sets based on a barcode manifest that defines the barcodes of the target. The decode performance may correspond to a decode rate of the barcodes on the target.

The process 400 may continue at block 410 by the computer system 702 inputting the first setting values and the first decode performance into a machine learning model. The machine learning model may be a non-parametric model, such as a Gaussian process regression model. The machine learning model can determine a representation of the setting space based on the first setting values and the first decode performance. The representation of the setting space can also be based on previously explored setting values and associated decode performances.

The process 400 may continue at block 411 by the computer system 702 inputting the machine learning model and conditions into an algorithm. For instance, the conditions can include one or more of a sample density in the setting space, an error minimization, and an optimality. Initially, the algorithm may select setting values based on the sample density. So, the algorithm may uniformly or randomly select the next setting values in the setting space until a sufficient sample density, as defined by the conditions, is reached. Once the computer system 702, or the algorithm, determines that the sample density exceeds a threshold, the algorithm may change to selecting setting values based on error minimization and/or optimality.

The process 400 may continue at block 412 by the computer system 702 receiving next setting values for the image acquisition system. The algorithm may generate the next setting values based on one or more of the conditions.

The process 400 may continue at block 414 by the computer system 702 adjusting the camera of the image acquisition system to have the next setting values. Similar to block 404, the computer system 702 can send the next setting values to the controller, which can cause the motor(s) to move according to the next setting values.

The process 400 may continue at block 416 by the computer system 702 receiving a next image of the target captured by the camera having the next setting values. Similar to block 406, the next image can depict the barcode sets included on the target.

The process 400 may continue at block 418 by the computer system 702 determining a next decode performance for the image acquisition system having the next setting values. The barcode decoder can decode the barcodes in the barcode sets based on the barcode manifest that defines the barcodes of the target.

The process 400 may continue at block 420 by the computer system 702 inputting the machine learning model and the conditions into the algorithm. Prior to inputting the machine learning model and the conditions into the algorithm, the next setting values and the next decode performance can be input into the machine learning model, which determines an updated representation of the setting space.

The process 400 may continue at block 422 by the computer system 702 determining whether a full setting space is explored. The computer system 702 can determine whether the conditions for the algorithm are met. For instance, if the sample density, the error minimization, and the optimality are each determined to satisfy corresponding thresholds, the computer system 702 can determine that the setting space is fully explored. If so, the computer system 702 can proceed to block 424, where the computer system 702 ends the process 400. Otherwise, the process 400 can return to block 412, where the computer system 702 receives next setting values.

Figure 5:
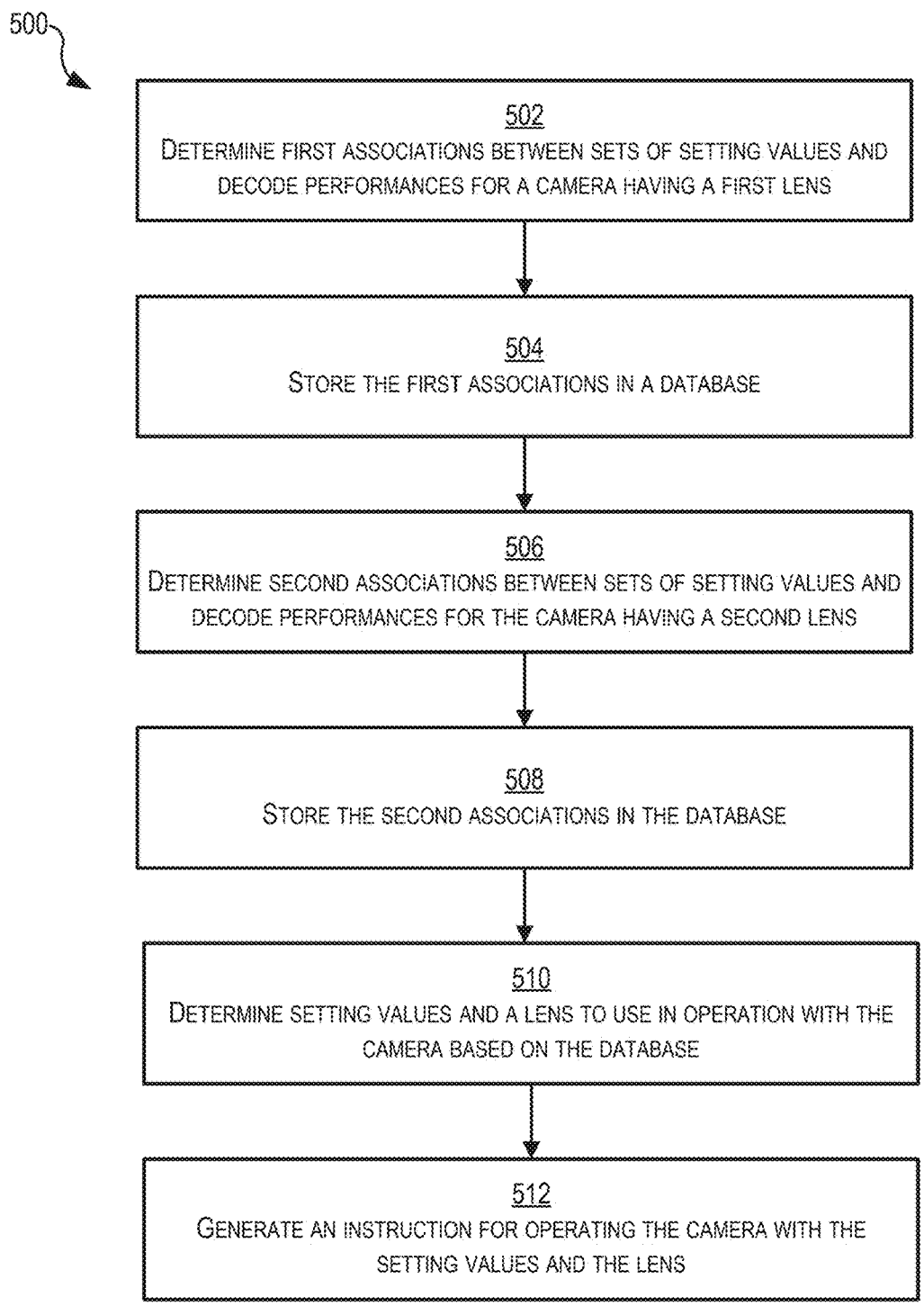
FIG. 5 illustrates an illustrates an example flowchart showing a process for implementing techniques relating to instructing camera operation based on optical lens characterization and calibration, according to at least one example.

FIG. 5 illustrates an illustrates an example flowchart showing a process 500 for implementing techniques relating to instructing camera operation based on optical lens characterization and calibration, according to at least one example. The setting analysis engine 710 (FIG. 7) embodied in the computer system 702 (FIG. 7) and/or within the user device 704 (FIG. 7) may perform the process 500. Thus, while the description below is from the perspective of the computer system 702, the user device 704 may also perform the process 500 or portions of the process 500.

The process 500 may begin at block 502 by the computer system 702 determining first associations between sets of setting values and decode performances for a camera having a first lens. An image of a target can be captured using the camera and the first lens for each set of setting values (e.g., distance to target, focus distance, aperture value, zoom, etc.). The computer system 702 can decode barcodes located on the target and depicted in an image to determine a decode performance for a particular set of setting values.

The process 500 may continue at block 504 by the computer system 702 storing the first associations in a database. So, each set of setting values is associated with a decode performance for a lens in the database. The first associations between the sets of setting values and the decode performances also include an association with the first lens. The database may be part of or accessible to the computer system 702.

The process 500 may continue at block 506 by the computer system 702 determining second associations between sets of setting values and decode performances for the camera having a second lens. Similar to the first associations, an image of a target can be captured using the camera and the second lens for each set of setting values. The sets of setting values used for the first lens may be the same or different than the sets of setting values used for the second lens. The computer system 702 can decode barcodes located on the target and depicted in an image to determine a decode performance for a particular set of setting values.

The process 500 may continue at block 508 by the computer system 702 storing the second associations in the database. The second associations between the sets of setting values and the decode performances also include an association with the second lens.

The process 500 may continue at block 510 by the computer system 702 determining setting values and a lens to use in operation with the camera based on the database. The computer system 702 may query the database to determine which set of setting values and the corresponding lens (e.g., the first lens or the second lens) is associated with a highest depth of field, as reflected by the decode performance. That is, the computer system 702 can determine which decode performance in the database is highest and then determine which set of setting values and lens correspond to that decode performance. Or, for a particular value of one of the setting values (e.g., a distance to target of three feet), the computer system 702 can determine the lens and the other setting values associated with a highest decode performance.

The process 500 may continue at block 512 by the computer system 702 generating an instruction for operating the camera with the setting values and the lens. The instruction can indicate the lens and the setting values that are to be used in operation with the camera. Accordingly, the camera can be outfitted with the lens and the settings can be set according to the setting values. Images can then be captured using the camera.

Figure 6:
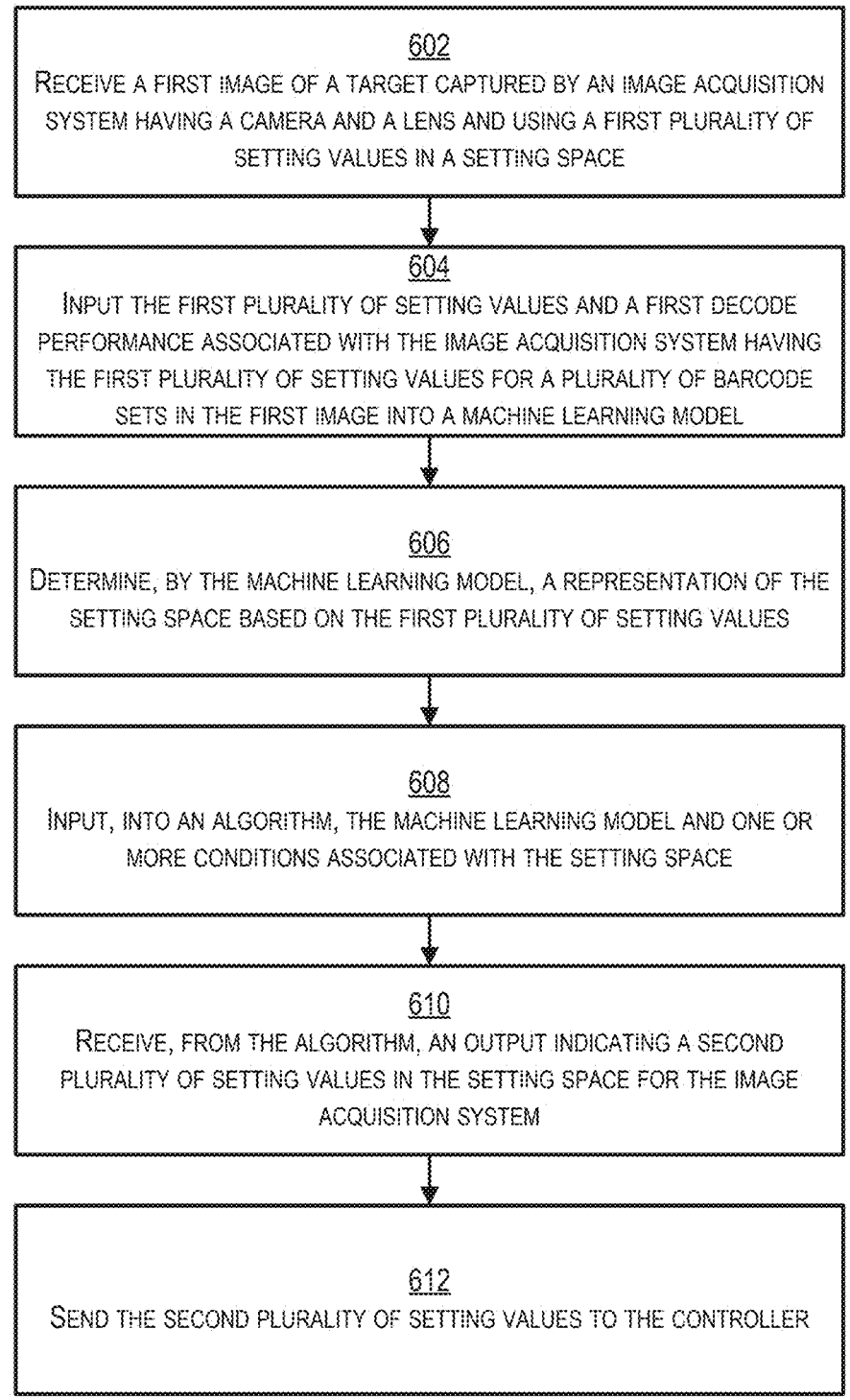
FIG. 6 illustrates an illustrates an example flowchart showing a process for implementing techniques relating to optical lens characterization and calibration, according to at least one example.

FIG. 6 illustrates an illustrates an example flowchart showing a process 600 for implementing techniques relating to optical lens characterization and calibration, according to at least one example. The setting analysis engine 710 (FIG. 7) embodied in the computer system 702 (FIG. 7) and/or within the user device 704 (FIG. 7) may perform the process 600. Thus, while the description below is from the perspective of the computer system 702, the user device 704 may also perform the process 600 or portions of the process 600.

The process 600 may begin at block 602 by the computer system 702 receiving a first image 112 (FIG. 1) of a target 208 (FIG. 2) captured by an image acquisition system having a camera 108 (FIG. 1) and a lens and using a first plurality of setting values 106 (FIG. 1) in a setting space. The image acquisition system can be part of a system that includes the computer system 702 and a rail 210 (FIG. 2) coupled to the camera 108. The camera 108 is configured to move along the rail 210 to adjust a distance to the target 208. The system can also include a first gear 203 coupled to a focus distance adjuster of the camera 108 and a second gear 205 coupled to an aperture value adjuster of the camera 108. The system can also include a first motor 207 coupled to the first gear 203 and the controller 201. The controller 201 can be configured to instruct the first motor 207 to set a focus distance of the camera 108 based on the first plurality of setting values 106. The system can also include a second motor 209 coupled to the second gear 205 and the controller 201. The controller 201 can be configured to instruct the second motor 209 to set an aperture value of the camera 108 based on the first plurality of setting values 106.

The first plurality of setting values 106 can include a first distance to the target 208, a first focus distance, and a first aperture value for the camera 108. The computer system 702 can send the first plurality of setting values 106 to a controller 201 (FIG. 2) coupled to the image acquisition system. The controller 201 can be configured to set a distance to a target, a focus distance, and an aperture value for the camera 108 based on the first plurality of setting values 106. The target 208 can include a plurality of barcode sets. Individual barcodes of a barcode set have a barcode attribute that is different than barcode attributes of other barcodes of the barcode set. The barcode attribute can be an X dimension. The plurality of barcode sets can be arranged at different depths along an optical axis of the camera 108, different distances away from a center line of the camera 108, and different orientations with respect to a center of the target 208.

The process 600 may continue at block 604 by the computer system 702 inputting the first plurality of setting values 106 and a first decode performance 122 (FIG. 1) associated with the image acquisition system having the first plurality of setting values 106 for the plurality of barcode sets in the first image 112 into a machine learning model 126 (FIG. 1). The machine learning model 126 can be a non-parametric model, or a Gaussian process regression model. The computer system 702 can determine the first decode performance 122 by decoding the plurality of barcode sets in the first image 112 using a barcode decoder 116 (FIG. 1) and determining a set of decoded barcodes 118 (FIG. 1) of the plurality of barcodes. The set of decoded barcodes 118 includes one or more barcodes of the plurality of barcode sets that match encoded information in a barcode manifest. The first decode performance 122 can correspond to a performance of the lens across a field of view of the camera 108.

The process 600 may continue at block 606 by the computer system determining, by the machine learning model 126, a representation of the setting space.

The process 600 may continue at block 608 by the computer system inputting, into an algorithm 127 (FIG. 1), the machine learning model 126 and one or more conditions 125 (FIG. 1). The one or more conditions 125 can include a sample density within the setting space, an error between a predicted decode performance and an actual decode performance and an optimality of decode performance.

The process 600 may continue at block 610 by the computer system 702 receiving, from the algorithm 127, an output indicating a second plurality of setting values 128 (FIG. 1) in the setting space for the image acquisition system. The algorithm 127 can be configured to determine the second plurality of setting values 128 based on the one or more conditions 125 associated with the setting space. The second plurality of setting values 128 can include a second distance to the target, a second focus distance, and a second aperture value for the camera. At least one of the second plurality of setting values 128 is different from the first plurality of setting values 106.

The process 600 may continue at block 612 by the computer system 702 sending the second plurality of setting values 128 to the controller 201. The controller 201 is configured to set the settings for the image acquisition system based on the second plurality of setting values 128. The computer system 702 can store first associations between setting values and decode performances for the camera 108 having the first lens in a database 132 (FIG. 1). The first associations can include a first association between the first plurality of setting values 106 and the first decode performance 122. The associations can also include a second association between the second plurality of setting values 128 and another decode performance determined based on another image of the target 208 captured by the camera 108 having the second plurality of setting values 128.

The computer system 702 can select, based on a query of the database 132, the first plurality of setting values 106 or the second plurality of setting values 128 for use with the image acquisition system. Selecting the first plurality of setting values 106 or the second plurality of setting values 128 for use with the image acquisition system can involve determining, based on the query of the database 132, that the decode performance 122 for the first plurality of setting values 16 is higher than the other decode performance for the second plurality of setting values 128 and outputting an instruction 136 (FIG. 1) for operating the camera 108 using the first plurality of setting values 106 based on the decode performance 122 being higher.

The computer system 702 may determine a working distance of the camera 108 to the target 208, where the settings for the camera 108 include a distance to the target. The computer system 702 can determine, based on a query of the database 132, a set of the first associations that have the working distance for the distance to the target. The set of the first associations includes the first association. The computer system 702 can determine that the first association has a highest decode performance compared to remaining decode performances of the set of the first associations and output an instruction 136 for operating the camera 108 with the first lens at the first plurality of setting values 106 based on the first decode performance 122 being highest for the working distance of the camera 108.

The computer system 702 can determine for the camera 108 having a second lens, a plurality of decode performances for a plurality of images captured of the target 208 by the camera 108 having the second lens and using different sets of setting values. The computer system 702 can store second associations between setting values and decode performances for the camera 108 having the second lens in the database 132. The second associations include the different sets of setting values and the plurality of decode performances. The computer system 702 can determine, based on a query of the database 132, that the first decode performance 122 for the first plurality of setting values 106 for the camera 108 having the first lens is higher than remaining decode performances in the database 132 for the camera 108 having the first lens and the plurality of decode performances for the camera 108 having the second lens. The computer system 702 can output an instruction 136 for operating the camera 108 with the first lens at the first plurality of setting values 106 based on the first decode performance 122 being higher.

In an example, the one or more conditions associated with determining the first plurality of setting values 106 can include the sample density within the setting space. The computer system 702 can decode, using the barcode decoder 116, the plurality of barcode sets in a second image captured by the camera 108 having the second plurality of setting values 128. The computer system 702 can determine a second decode performance of the image acquisition system associated with the second plurality of setting values 128 for plurality of barcode sets. The computer system 702 can determine that the sample density exceeds a threshold, input the second plurality of setting values 128 and the second decode performance for the plurality of barcode sets in the second image captured by the camera 108 having the second plurality of setting values 128 into the machine learning model 126, and determine an updated representation of the setting space. The computer system can input the machine learning model 126 and the one or more conditions 125 including at least one of: an error between a predicted decode performance and an actual decode performance and an optimality of decode performance into the algorithm 127 and receive, from algorithm 127, a second output indicating a third plurality of setting values in the setting space for the image acquisition system.

Figure 7:
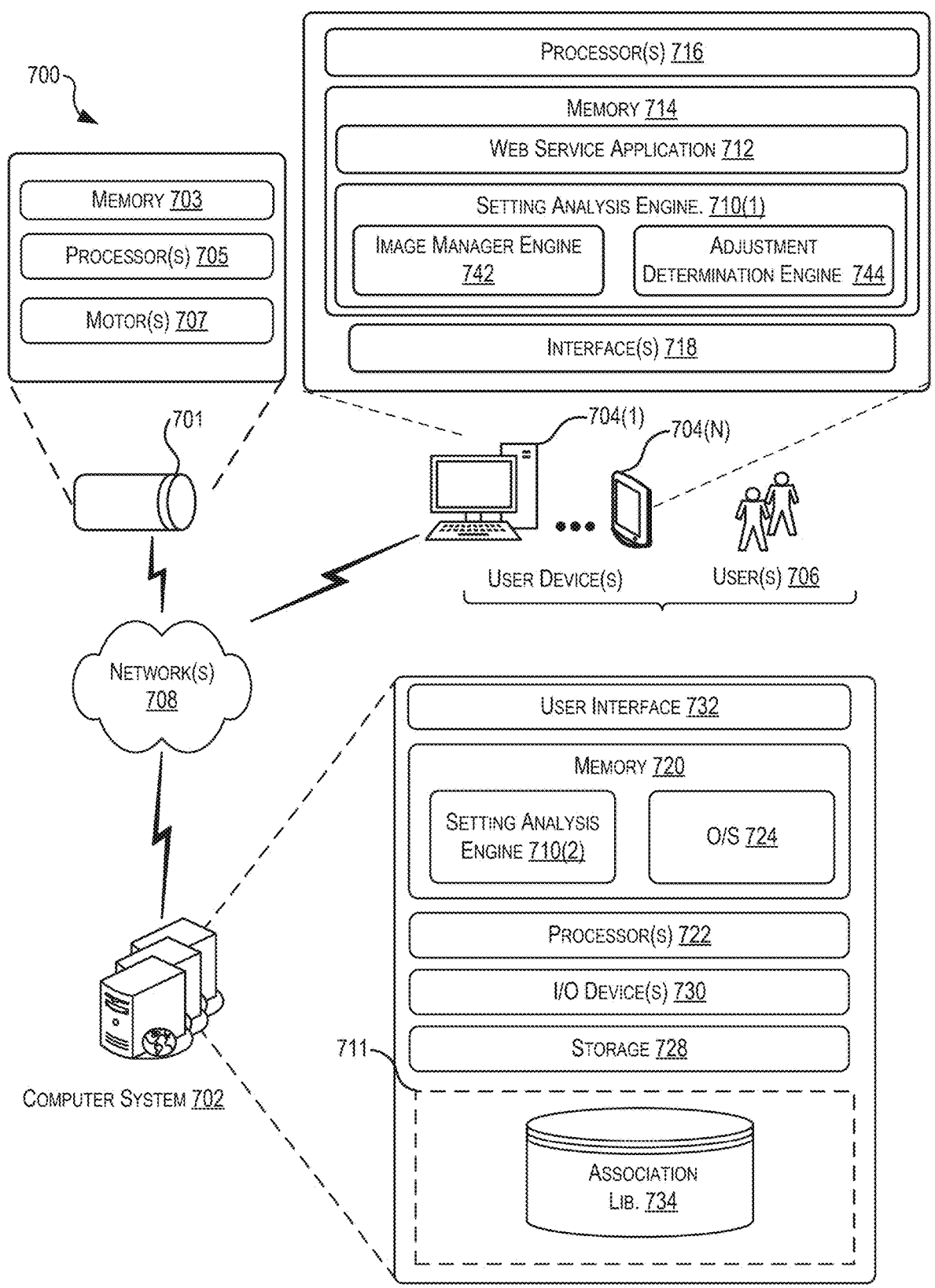
FIG. 7 illustrates an example schematic architecture for implementing techniques relating to optical lens characterization and calibration, according to at least one example.

FIG. 7 illustrates an example schematic architecture 700 for implementing techniques relating to optical lens characterization and calibration, according to at least one example. The architecture 700 may include a computer system 702 (e.g., the computer system described herein) in communication with one or more user devices 704(1)-704(N) via one or more networks 708 (hereinafter, "the network 708"). The computer system 702 is also in communication with a camera 701, which can be an example of the camera 108 in FIG. 1.

The user device 704 may be operable by one or more users 706 to interact with the computer system 702. The users 706 may be administrators, developers, or others that desire to test or utilize operations of the techniques described herein. The user device 704 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 704(1) is illustrated as a desktop computer, while the user device 704(N) is illustrated as an example of a handheld mobile device.

The user device 704 may include a memory 714 and processor(s) 716. In the memory 714 may be stored program instructions that are loadable and executable on the processor(s) 716, as well as data generated during the execution of these programs. Depending on the configuration and type of user device 704, the memory 714 may be volatile (such as random access memory ("RAM") and/or non-volatile (such as read-only memory (ROM), flash memory, etc.).

In some examples, the memory 714 may include a web service application 712 and a version of a setting analysis engine 710 (e.g., 710(1)). The web service application 712 and/or the setting analysis engine 710(1) may allow the user 706 to interact with the computer system 702 via the network 708. The user device 704 may also include one or more interfaces 718 to enable communication with other devices, systems, and the like. The setting analysis engine 710, whether embodied in the user device 704 or the computer system 702, may be configured to perform the techniques described herein.

The setting analysis engine 710 includes an image manager engine 742 and an adjustment determination engine 744. In an example, the setting analysis engine 710 can include any other suitable engines, modules, models, and the like.

The image manager engine 742 can manage various tasks related to the generating and processing an image of a target.

In an example, the image manager engine 742 may generate an image, may ingest an image, may input an image into a barcode decoder, may determine decoded barcodes based on a barcode manifest, and any other suitable tasks with respect to the images described herein.

The adjustment determination engine 744 can include one or more computer services for determining an adjustment for setting of a lens of a camera based on information generated by the image manager engine 742. In an example, the adjustment determination engine 744 may include a non-parametric model and an algorithm. The adjustment determination engine 744 may ingest setting values and a decoded performance associated with the setting values, may apply the non-parametric function to determine a representation of the setting space, may input the non-parametric model and conditions to the algorithm and determine additional setting values to analyze for the camera, may generate an instruction for an adjustment of the lens based on the additional setting values, may transmit or otherwise share the instruction, and any other suitable tasks.

Turning now to the details of the computer system 702, the computer system 702 may include one or more computer system computers, perhaps arranged in a cluster of servers or as a server farm, and may host web service applications. The function of the computer system 702 may be implemented a cloud-based environment such that individual components of the computer system 702 are virtual resources in a distributed environment.

The computer system 702 may include at least one memory 720 and one or more processing units (or processor(s)) 722. The processor 722 may be implemented as appropriate in hardware, computer-executable instructions, software, firmware, or combinations thereof. Computer-executable instruction, software, or firmware implementations of the processor 722 may include computer-executable or machine-executable instructions written in any suitable programming language to perform the various functions described. The memory 720 may include more than one memory and may be distributed throughout the computer system 702. The memory 720 may store program instructions that are loadable and executable on the processor(s) 722, as well as data generated during the execution of these programs. Depending on the configuration and type of memory including the computer system 702, the memory 720 may be volatile (such as RAM and/or non-volatile (such as read-only memory ("ROM"), flash memory, or other memory)). The memory 720 may include an operating system 724 and one or more application programs, modules, or services for implementing the features disclosed herein including at least a version of the setting analysis engine 710 (e.g., 710(2)). For example, the setting analysis engine 710(2) may perform the functionality described herein.

The computer system 702 may also include additional storage 728, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 728, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 702 and/or part of the user device 704.

The computer system 702 may also include input/output (I/O) device(s) and/or ports 730, such as for enabling connection with a keyboard, a mouse, a pen, a voice input device, a touch input device, a display, speakers, a printer, or other I/O device.

In some examples, the computer system 702 may also include one or more user interface(s) 732. The user interface 732 may be utilized by an operator, curator, or other authorized user to access portions of the computer system 702. In some examples, the user interface 732 may include a graphical user interface, voice interfaces, web-based applications, programmatic interfaces such as APIs, or other user interface configurations.

The computer system 702 may also include a data store 711. In some examples, the data store 711 may include one or more databases, data structures, or the like for storing and/or retaining information associated with the computer system 702 and which, in some examples, may be accessible by the user devices 704. The setting analysis engine 710 is communicatively coupled (e.g., via a wired connection or a wireless connection) to the data store 711. The data store 711 includes an association library 734 for storing associations between setting values for a lenses and decode performances. In an example, the data store 711 can include any other suitable data, databases, libraries, and the like.

The camera 701 may include at least one memory 703 and one or more processing units (or processor(s)) 705, which may be an example of the controller 201 in FIG. 1. The processor 705 may be implemented as appropriate in hardware, computer-executable instructions, software, firmware, or combinations thereof. Computer-executable instruction, software, or firmware implementations of the processor 705 may include computer-executable or machine-executable instructions written in any suitable programming language to perform the various functions described. The memory 703 may include more than one memory and may be distributed throughout the camera 701. The memory 703 may store program instructions that are loadable and executable on the processor(s) 705, as well as data generated during the execution of these programs. Depending on the configuration and type of memory included in the camera 701, the memory 703 may be volatile (such as RAM and/or non-volatile (such as read-only memory ("ROM"), flash memory, or other memory)). Although not shown, the memory 703 may include an (e.g., operating system 724) and one or more application programs, modules, or services for implementing the features disclosed herein (e.g., including at least a version of the setting analysis engine 710). The camera 701 also includes one or more motor(s) 707 for controlling settings of the camera 701. The processor 705 can instruct the motor(s) 707 about how to adjust gears to control the settings.

Figure 8:
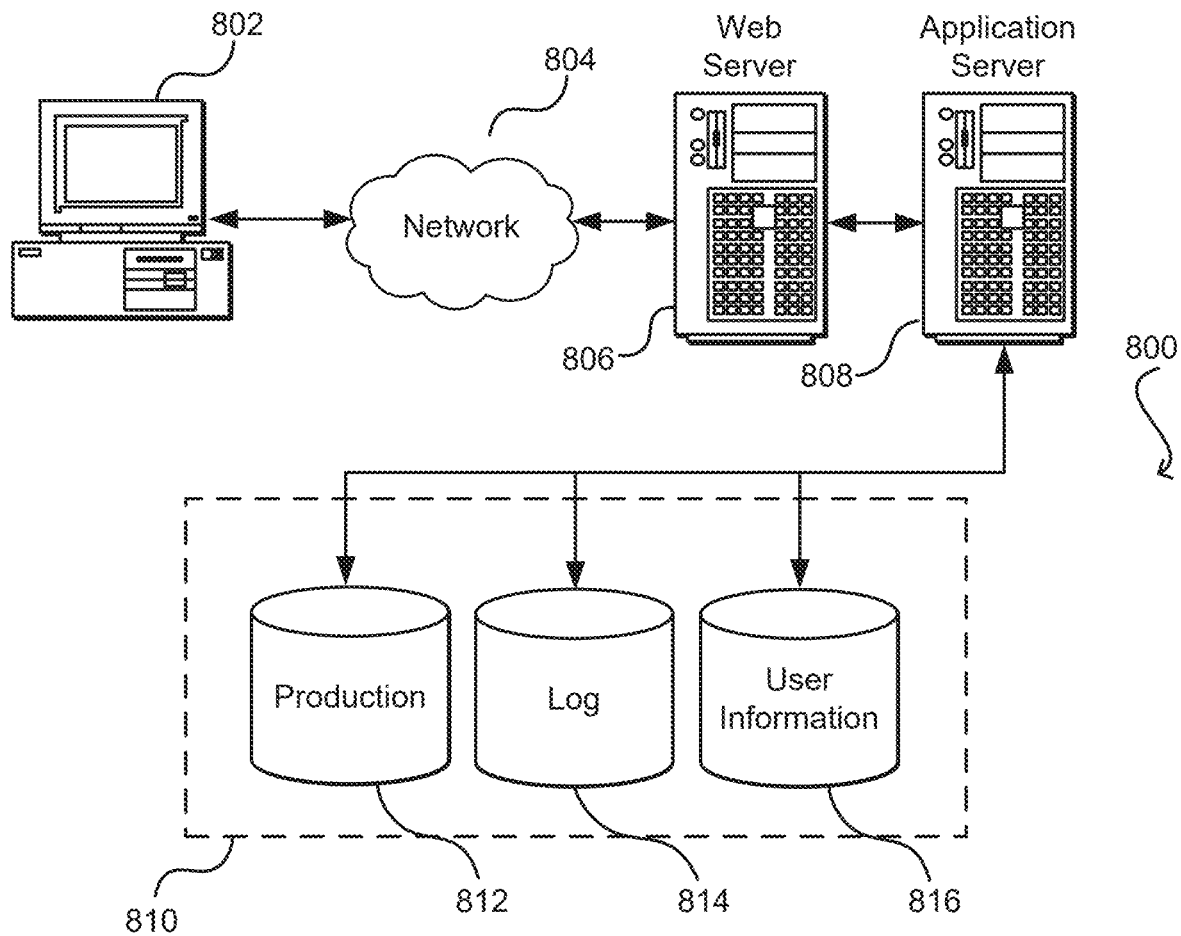
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
sending a first plurality of setting values in a setting space to a controller coupled to an image acquisition system including a camera having a lens, wherein the controller is configured to set a distance to a target, a focus distance, and an aperture value for the camera based on the first plurality of setting values;
receiving an image of the target captured by the camera having the first plurality of setting values, wherein the target includes a plurality of barcode sets, and wherein individual barcodes of a barcode set have a barcode attribute that is different than barcode attributes of other barcodes of the barcode set;
decoding the plurality of barcode sets in the image using a barcode decoder;
determining a decode performance of the image acquisition system associated with the first plurality of setting values for the plurality of barcode sets;
inputting the first plurality of setting values and the decode performance into a non-parametric model;
determining, by the non-parametric model, a representation of the setting space based on the first plurality of setting values;
inputting, into an algorithm, the non-parametric model and one or more conditions associated with the setting space;
receiving, from the algorithm, an output indicating a second plurality of setting values in the setting space for the camera;
storing associations between setting values and decode performances in a database, the associations including a first association between the first plurality of setting values and the decode performance and a second association between the second plurality of setting values and another decode performance determined based on another image of the target captured by the camera having the second plurality of setting values; and
selecting, based on a query of the database, the first plurality of setting values or the second plurality of setting values for use with the image acquisition system.

2. The computer-implemented method of claim 1, wherein selecting the first plurality of setting values or the second plurality of setting values for use with the image acquisition system comprises:
determining, based on the query of the database, that the decode performance for the first plurality of setting values is higher than the other decode performance for the second plurality of setting values; and
outputting an instruction for operating the camera or a different camera using the first plurality of setting values based on the decode performance being higher.

3. The computer-implemented method of claim 1, wherein the plurality of barcode sets are arranged at different depths along an optical axis of the camera, different distances away from a center line of the camera, and different orientations with respect to a center of the target, and wherein the decode performance corresponds to a performance of the lens across a field of view of the camera.

4. The computer-implemented method of claim 1, wherein the image is a first image, the decode performance is a first decode performance, the output is a first output, the one or more conditions associated with determining the first plurality of setting values comprise a sample density within the setting space, and wherein the computer-implemented method further comprises:
decoding, using the barcode decoder, the plurality of barcode sets in a second image captured by the camera having the second plurality of setting values;
determining a second decode performance of the image acquisition system associated with the second plurality of setting values for plurality of barcode sets;
determining that the sample density exceeds a threshold;
inputting the second plurality of setting values and the second decode performance into the non-parametric model;
determining, by the non-parametric model, an updated representation of the setting space based on the second plurality of setting values;
inputting, into the algorithm, the non-parametric model and the one or more conditions associated with the setting space comprising at least one of: an error between a predicted decode performance and an actual decode performance and an optimality of decode performance; and
receiving, from the algorithm, a second output indicating a third plurality of setting values in the setting space for the camera.

5. A computer-implemented method, comprising:
receiving a first image of a target captured by an image acquisition system having a camera and a lens and using a first plurality of setting values in a setting space, wherein the target includes a plurality of barcode sets, and wherein individual barcodes of a barcode set have a barcode attribute that is different than barcode attributes of other barcodes of the barcode set;
inputting the first plurality of setting values and a first decode performance associated with the image acquisition system having the first plurality of setting values for the plurality of barcode sets in the first image into a machine learning model;
determining, by the machine learning model, a representation of the setting space based on the first plurality of setting values;
inputting, into an algorithm, the machine learning model and one or more conditions associated with the setting space;
receiving, from the algorithm, an output indicating a second plurality of setting values in the setting space for the image acquisition system; and
sending the second plurality of setting values to a controller, wherein the controller is configured to set settings for the image acquisition system based on the second plurality of setting values.

6. The computer-implemented method of claim 5, wherein the first plurality of setting values includes a first distance to the target, a first focus distance, and a first aperture value for the camera, wherein the second plurality of setting values includes a second distance to the target, a second focus distance, and a second aperture value for the camera, and wherein at least one of the second plurality of setting values is different from the first plurality of setting values.

7. The computer-implemented method of claim 5, further comprising:
  determining the first decode performance by:
    decoding the plurality of barcode sets in the first image using a barcode decoder; and
    determining a set of decoded barcodes of the plurality of barcode sets, wherein the set of decoded barcodes includes one or more barcodes of the plurality of barcode sets that match encoded information in a barcode manifest.

8. The computer-implemented method of claim 5, wherein the algorithm is configured to determine the second plurality of setting values based on the one or more conditions associated with the setting space, and wherein the one or more conditions include a sample density within the setting space, an error between a predicted decode performance and an actual decode performance and an optimality of decode performance.

9. The computer-implemented method of claim 5, wherein the lens is a first lens, and the computer-implemented method further comprises:
  storing first associations between setting values and decode performances for the camera having the first lens in a database, the first associations including a first association between the first plurality of setting values and the first decode performance.

10. The method of claim 9, further comprising:
  determining a working distance of the camera to the target, wherein the settings for the image acquisition system include a distance to the target;
  determining, based on a query of the database, a set of the first associations that have the working distance for the distance to the target, wherein the set of the first associations includes the first association;
  determining that the first association has a highest decode performance compared to remaining decode performances of the set of the first associations; and
  outputting an instruction for operating the camera with the first lens at the first plurality of setting values based on the first decode performance being highest for the working distance of the camera.

11. The computer-implemented method of claim 9, further comprising:
  determining, for the camera having a second lens, a plurality of decode performances for a plurality of images captured of the target by the camera having the second lens and using different sets of setting values; and
  storing second associations between setting values and decode performances for the camera having the second lens in the database, the second associations including the different sets of setting values and the plurality of decode performances.

12. The computer-implemented method of claim 11, further comprising:
  determining, based on a query of the database, that the first decode performance for the first plurality of setting values for the camera having the first lens is higher than remaining decode performances in the database for the camera having the first lens and the plurality of decode performances for the camera having the second lens; and
  outputting an instruction for operating the camera with the first lens at the first plurality of setting values based on the first decode performance being higher.

13. The computer-implemented method of claim 11, wherein the barcode attribute comprises an X dimension.

14. A system comprising:
  an image acquisition system including a camera having a lens;
  a computer system comprising:
    one or more processors; and
    one or more memory storing instructions that, upon execution by the one or more processors, configure the system to:
      receive a first image of a target captured by the image acquisition system having a first plurality of setting values in a setting space, wherein the target includes a plurality of barcode sets, and wherein individual barcodes of a barcode set have a barcode attribute that is different than barcode attributes of other barcodes of the barcode set;
      input the first plurality of setting values and a first decode performance associated with the image acquisition system for the plurality of barcode sets in the first image into a machine learning model;
      determine, by the machine learning model, a representation of the setting space based on the first plurality of setting values;
      input, into an algorithm, the machine learning model and one or more conditions associated with the setting space;
      receive, from the algorithm, an output indicating a second plurality of setting values in the setting space for the image acquisition system; and
      send the second plurality of setting values to a controller, wherein the controller is configured to set settings for the image acquisition system based on the second plurality of setting values.

15. The system of claim 14, further comprising:
  a rail coupled to the camera, wherein the camera is configured to move along the rail to adjust a distance to the target;
  a first gear coupled to a focus distance adjuster of the camera, and
  a second gear coupled to an aperture value adjuster of the camera.

16. The system of claim 15, further comprising:
  a first motor coupled to the first gear and the controller, wherein the controller is configured to instruct the first motor to set a focus distance of the camera based on the first plurality of setting values; and
  a second motor coupled to the second gear and the controller, wherein the controller is configured to instruct the second motor to set an aperture value of the camera based on the first plurality of setting values.

17. The system of claim 14, wherein the algorithm is configured to determine the second plurality of setting values based on the one or more conditions associated with the setting space, and wherein the one or more conditions include a sample density within the setting space, an error between a predicted decode performance and an actual decode performance and an optimality of decode performance.

18. The system of claim 17, wherein the output is a first output, the one or more conditions associated with determining the first plurality of setting values comprise the sample density within the setting space, and wherein the one or more memory further store instructions that configure the system to:
  determine that the sample density exceeds a threshold;
  input the second plurality of setting values and a second decode performance for the plurality of barcode sets in a second image captured by the camera having the second plurality of setting values into the machine learning model;

determine, by the machine learning model, an updated representation of the setting space based on the second plurality of setting values;

input, into the algorithm, the machine learning model and the one or more conditions associated with the setting space comprising at least one of: an error between a predicted decode performance and an actual decode performance and an optimality of decode performance; and receive, from the algorithm, a second output indicating a third plurality of setting values in the setting space for the image acquisition system.

19. The system of claim 14, wherein the machine learning model comprises a Gaussian process regression model.

20. The system of claim 14, wherein the plurality of barcode sets are arranged at different depths along an optical axis of the camera, different distances away from a center line of the camera, and different orientations with respect to a center of the target, and wherein the first decode performance corresponds to a performance of the lens across a field of view of the camera.

* * * * *